US005942271A

United States Patent [19]

van Drooge

[11] Patent Number: 5,942,271

[45] Date of Patent: Aug. 24, 1999

[54] METHOD FOR THE REMOVAL OF SKINS FROM FRUITS OR VEGETABLES BY VAPOUR EXPLOSION

[75] Inventor: Barend Lodewijk van Drooge, Arnhem, Netherlands

[73] Assignee: TO & MMA B.V., Arnhem, Netherlands

[21] Appl. No.: 08/907,596

[22] Filed: Aug. 8, 1997

Related U.S. Application Data

[63] Continuation of application No. PCT/NL96/00075, Feb. 16, 1996.

[30] Foreign Application Priority Data

Feb. 16, 1995 [NL] Netherlands ........................... 9500290

[51] Int. Cl.[6] ........................................................ A23L 1/10

[52] U.S. Cl. ............................................ 426/482; 426/481

[58] Field of Search .................................... 426/482, 447, 426/615, 616, 637, 629, 481

[56] References Cited

U.S. PATENT DOCUMENTS 5,168,802 12/1992 Silvestrini et al. ....................... 99/584

FOREIGN PATENT DOCUMENTS 515513 4/1981 Australia .
2144135 2/1973 France .
2507062 12/1982 France .
3407053 8/1995 Germany .
2020544 11/1979 United Kingdom .
2247829 3/1992 United Kingdom .

OTHER PUBLICATIONS

Database Abstrace. AN: 75–23571W[14] WPIDS for SU 305707. Assign.: Krasnodar Food Inds, Aug. 1974.

*Primary Examiner*—Anthony J. Weier
*Attorney, Agent, or Firm*—McCutchen, Doyle, Brown & Enersen

[57] ABSTRACT

This invention describes a method for removing the skins of fruits and vegetables by explosive vaporization of the moisture in the fruit or vegetable under the skin. The fruit or vegetable is placed in a peeling vessel, and the pressure in the vessel is rapidly lowered, below atmospheric pressure, so as to cause explosive vaporization of the moisture. Some of the air in the peeling vessel may be removed prior to explosive vaporization, so that it can be carried out by mere condensation of water vapour present in the peeling chamber (without the aid of a vacuum pump or other vacuum device, for instance). In addition, the fruit or vegetable may be cooled prior to explosive vaporization, so that it can be carried out at a lower temperature than without such cooling, which is favorable to preserving the physical consistency and other qualities of some fruits and vegetables.

5 Claims, 2 Drawing Sheets

40
41
42
43
44
45
46
47
48
49
50
51
52
53
55
56
58

METHOD FOR THE REMOVAL OF SKINS FROM FRUITS OR VEGETABLES BY VAPOUR EXPLOSION

This application is a continuation of international application Number PCT/NL96/00075 filed Feb. 16, 1996, which claims priority to Netherlands Application No. 9500290, filed Feb. 16, 1995.

BRIEF DESCRIPTION OF THE INVENTION

The present invention relates to a method for removing skins from fruits or vegetables by vapour explosion, comprising the steps of:

introducing a fruit or vegetable to be peeled into a peeling vessel, feeding water vapour at a suitably chosen pressure and temperature to said peeling vessel over a chosen period to heat said fruit or vegetable to be peeled superficially, subsequently lowering of the pressure in said peeling vessel to a pressure situated below atmospheric pressure in order to vaporize moisture present under the skin of said fruit or vegetable explosively, as a result of which the skin is blown from said fruit or vegetable.

DESCRIPTION OF THE PRIOR ART

The French patent FR 2 144 135 discloses a method and device for the "batchwise" steam peeling of, for example, potatoes, carrots, beets etc.

In this known method, the fruit or vegetable is introduced into the peeling vessel, which is closed, after which the fruit or vegetable is heated with the aid of water vapour fed to the peeling vessel. In FR 2 144 135 it is described that when the fruit or vegetable has been heated sufficiently, in which connection it is solely the temperature of the outermost layer of the fruit or vegetable to be peeled which is of importance, the pressure in the peeling vessel is rapidly lowered to below atmospheric pressure in order to vaporize the heated moisture under the skin. The vapour thus obtained under the skin is at an overpressure with respect to the pressure on the outside of the skin (the pressure in the peeling vessel) and said vapour cannot diffuse outwards through the skin in said short time, as a result of which the skin is, as it were, blown from the fruit or vegetable. After having been peeled in this way, the fruit or vegetable generally also undergoes a mechanical aftertreatment in order to remove loose parts of skin adhering to the fruit or vegetable.

FR 2 144 135 describes, as prior art, also another known peeling method, in which, in order to peel the vegetable or fruit, the pressure in the peeling vessel is reduced to atmospheric pressure and not below it. Such a method is disclosed, for example, in NL 7903825. In order to achieve an explosive vapour formation under the skin of the fruit or vegetable in the case of the method mentioned last, the blow-off temperature (the temperature at which vapour formation of a sufficiently high pressure with respect to the outside of the skin occurs under the skin of the fruit or vegetable) has to be above 100° C. As is pointed out in FR 2 144 135, such high temperatures lead to the result that an undesirably thick layer of the fruit or vegetable becomes soft and weak, that part of the fruit or vegetable which has become soft being removed and lost during the mechanical aftertreatment. In the method according to FR 2 144 135, the blow-off temperature is lower and the loss of fruit or vegetable is therefore lower in principle.

The method described in FR 2 144 135 has the disadvantage that, when said method is carried out, the skin is not removed from the fruit or vegetable in a satisfactory manner.

OBJECT OF THE INVENTION

The object of the present invention is to provide a method which yields a better removal of the skin with a very small loss of the fruit or vegetable.

SUMMARY OF THE INVENTION

The present invention provides a method for removing skins from fruits or vegetables by vapour explosion, wherein, to carry out the step of lowering the pressure in the peeling vessel in order to vaporize moisture present under the skin of the fruit or vegetable explosively, the starting point is a state in which an amount of air is present in the peeling vessel which, as a maximum, is such that the pressure in the peeling vessel can be lowered to the predetermined pressure situated below atmospheric pressure solely by condensing the water vapour and without having to remove air from the peeling vessel.

In other words, if, for example, a pressure lowering in the peeling vessel to a pressure of 0.1 bar is intended for the purpose of vapour explosion peeling of a particular fruit or vegetable, the invention proposes to remove at least 90% of the air from the closed peeling vessel prior to the pressure lowering resulting in the vapour explosion.

The present invention therefore provides that, prior to the pressure lowering resulting in the vapour explosion, only a reduced amount of air or, preferably, virtually no air is present in the peeling vessel, as a result of which the result is achieved that, in practice, for effecting the vapour explosion under the skin, the pressure in the peeling vessel can be reduced more rapidly, in a more controllable manner and to lower pressure values than in the case of the method according to FR 2 144 135. The method according to the invention makes the use of technically simple means possible. Because the pressure lowering in the peeling vessel can now be achieved more rapidly, a much more explosive formation of vapour occurs under the skin of the fruit or vegetable and consequently a better peeling action.

Since by the method according to the invention the pressure lowering resulting in a vapour explosion can, in practice, be effected to very low pressure values, the method according to the invention also makes it possible to heat the fruit or vegetable to lower temperatures and for a shorter time than the method disclosed in FR 2 144 135. The method according to the invention therefore has a smaller heat loss than the known method. A further important advantage of heating the fruit or vegetable to a lower temperature is that the part of the fruit or vegetable situated more deeply underneath the skin is also heated less strongly and consequently remains firmer than in the known method. Because the fruit or vegetable remains firm under the skin, only the real skin is blown off during the sudden vapour formation and appreciably less of the fruit or vegetable is lost than in the known method. As a result of maintaining the firmness of the fruit or vegetable, markedly less of the fruit or vegetable is also lost during a mechanical aftertreatment of the fruit or vegetable, which is economically advantageous.

In the case of the method according to the present invention, apart from the fruit or vegetable to be peeled, water vapour and possibly some water, preferably no air or, at any rate, little air will be present in the peeling vessel at the instant when the pressure lowering resulting in a vapour explosion under the skin is started in the peeling vessel. In practice, it will be possible to observe that some of the water vapour fed to the peeling vessel will condense immediately so that the peeling vessel will contain a small amount of water also for that reason.

The method according to the invention can be implemented by removing the air present in the peeling vessel as much as possible after the fruit or vegetable to be peeled has been introduced into the peeling vessel and the peeling vessel has been closed. This can be done, for example, with the aid of a vacuum pump which removes the air from the peeling vessel. Advantageously, the air present in the peeling vessel is removed by displacing the air from the peeling vessel by feeding water vapour to the peeling vessel. In this case, use is made of the difference in specific weight between the air and the water vapour fed in.

Another manner of implementation of the invention is filling the peeling vessel with liquid, generally water, after introducing the fruit or vegetable to be peeled into the peeling vessel, after which the peeling vessel is closed and the liquid is removed from the peeling vessel.

It is also possible to feed the fruit or vegetable to the peeling vessel with the aid of a stream of liquid so that the peeling vessel is automatically filled with liquid and fruit or vegetable. After closing the peeling vessel, water vapour can be fed to the peeling vessel simultaneously with the removal of the liquid. This makes it possible to achieve the result that the water vapour helps to remove the liquid from the peeling vessel. Preferably all liquid, most likely water, is removed from the peeling vessel before the step of lowering the pressure is carried out, otherwise remaining liquid could vaporize during the lowering of the pressure which would slow down the lowering of the pressure.

The lowering of the pressure in the peeling vessel filled with heated fruit or vegetable and water vapour to below atmospheric pressure may be achieved, for example, by bringing the peeling vessel into communication with a vacuum vessel by opening a valve. Before said vacuum vessel is brought into communication with the peeling vessel, such a pressure below atmospheric pressure should in that case prevail in the vacuum vessel and the volume of said vacuum vessel should be such that the pressure in the total volume of the interconnected vessels ends up below atmospheric pressure. Because, according to the invention, the air is removed prior to the step of lowering the pressure in the peeling vessel, appreciably less medium has to be removed from the peeling vessel during this step than in the known method, as a result of which a very rapid pressure lowering can be achieved.

The removal of air from the peeling vessel, or proceeding in such a way that no air enters the peeling vessel when the fruit or vegetable is introduced, before heating the fruit or vegetable with water vapour is particularly advantageous because, according to a preferred embodiment of the method according to the invention, it is then possible, after the fruit or vegetable has been heated to the desired extent, to achieve the desired rapid lowering of the pressure in the peeling vessel to below atmospheric pressure for blowing off the skin by cooling the water vapour present in the peeling vessel so that the water vapour is converted into condensate and the water vapour is therefore, as it were, eliminated. This can preferably be done by introducing a coolant into the peeling vessel, for example by spraying cold water into the peeling vessel.

For fruits or vegetables which are too soft at normal ambient temperature to be peeled mechanically, provision can be made that the fruit or vegetable to be peeled is first cooled before peeling. The cooling can be brought about, for example, by cooling the fruit or vegetable in the peeling vessel. In this connection, the fruit or vegetable may even be cooled to such an extent that it is frozen.

It is clear that the methods described above for lowering the pressure in the peeling vessel may also be used, if desired, in combination.

The present invention also provides a device which is suitable for carrying out the method described above, wherein the lowering of the pressure is achieved by cooling the water vapour present in the peeling vessel. Advantageously a thermally insulating lining is provided on the inside of the peeling vessel. The internal lining has the important advantage that the cooling of the water vapour takes place much more quickly than if heat present in the wall of the peeling vessel can heat the water vapour up again. Also, by means of the insulating lining, the repeated heating and cooling again of the metal wall of the peeling vessel situated round the outside are largely avoided and heat loss during peeling is limited.

The insulation material should be of a type which does not absorb any moisture because, on the one hand, absorption of moisture reduces the insulation value and, on the other hand, the lining of the peeling vessel would also be blown by vapour formation in and behind the lining during the lowering of the pressure in the peeling vessel. A suitable insulation material is, for example, a thermoplastic fluoropolymer or fluoroplastic.

BRIEF DESCRIPTION OF THE DRAWINGS

The invention will now be explained in greater detail by reference to the drawings. In the drawings.

DETAILED DESCRIPTION OF THE INVENTION

Figure 1:
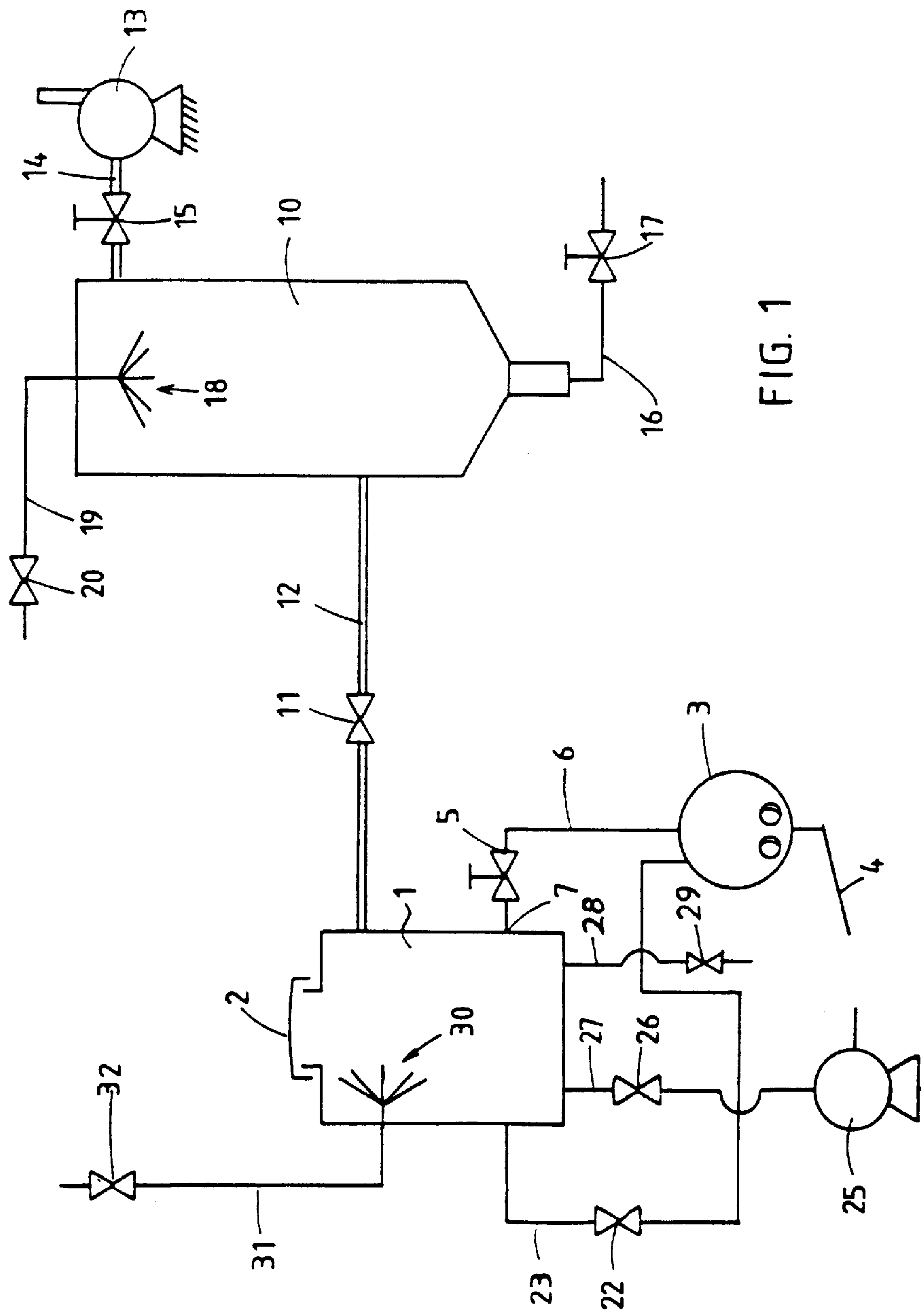
FIG. 1 shows a diagrammatic reproduction of a first exemplary embodiment of a device for peeling with the aid of vapour explosion in a manner according to the invention.

The device shown diagrammatically in FIG. 1 for removing skins from fruits or vegetables by means of vapour explosion comprises a metallic peeling vessel 1 which is provided with an opening, which can be closed off by a valve 2, for introducing and removing the fruit or vegetable. Water supplied via pipe 4 can be heated by means of heating unit 3 so that water vapour at a suitable temperature and pressure is obtained. In this connection, the water vapour may be either steam (pressure above 1 bar and temperature above 100° C.) or water vapour at a lower temperature and pressure. The water vapour can be fed to water-vapour connection 7 of the peeling vessel 1 via a pipe 6 provided with a valve 5.

The system furthermore comprises a closed vessel 10 which is in communication with the peeling vessel 1 via a pipe 12 provided with valve 11. A vacuum pump 13 is connected to the vessel 10 via a pipe 14 having valve 15. The vessel 10 is provided at the bottom with a connection for drainage pipe 16, which can be closed off with the aid of valve 17.

In the vessel 10, there is a spraying system 18 with which cooling water supplied via pipe 19 having valve 20 can be sprayed into the vessel 10.

A pipe 23 provided with a valve 22 connects to the peeling vessel 1 and makes it possible to supply water heated with the aid of the heating unit 3 to the peeling vessel 1. A pump 25 is also connected to the peeling vessel 1 via a pipe 27 provided with valve 26.

Disposed in the peeling vessel 1 is a spraying system 30 with which cooling water supplied via pipe 31, which incorporates valve 32, can be sprayed into the peeling vessel 10.

The device shown in FIG. 1 can be used to peel fruits or vegetables in the manner according to the invention, which will be explained below.

First, a batch of fruit or vegetable to be peeled, for example potatoes, is introduced into the peeling vessel 1. With the lid 2 still in the open position, the peeling vessel 1 is then filled with hot water which is supplied via the pipe 23. When the peeling vessel 1 is full, the peeling vessel 1 is closed in a gastight manner by means of the lid 2. The valve 26 is opened and the hot water is withdrawn from the peeling vessel 1 with the aid of the pump 25. The feeding of hot water (for example, 50° C.) results in preheating of the fruit or vegetable. A vacuum is produced in the peeling vessel 1 by the withdrawal of the water from the gastightly closed peeling vessel 1. When the water has been pumped out to a sufficient extent or completely, valve 26 is closed.

The fruit or vegetable can now be heated superficially by feeding water vapour brought to a suitable pressure and temperature to the peeling vessel 1 by opening the valve 5. The water vapour may, however, also be supplied simultaneously with the drainage of the water, as a result of which the water vapour assists in removing the water.

The water vapour fed to the peeling vessel 1 achieves the result that the outermost layer of the fruit or vegetable to be peeled is heated up. Depending on the fruit or vegetable, the supply of water vapour can be stopped after a certain time.

As has already been stated above, to bring about a vapour explosion under the skin of the fruit or vegetable, a rapid lowering of pressure has now to be produced in the peeling vessel 1. In the system shown in FIG. 1, this is done, on the one hand, by spraying cold water into the peeling vessel 1 using the spraying system 30. The water vapour present in the peeling vessel 1 will then immediately condense and, as a result, the pressure in the peeling vessel 1 drops. On the other hand, the valve 11 is also opened, as a result of which the water vapour flows out of the peeling vessel 1 to the vessel 10 which is below atmospheric pressure. The consequence is that the pressure in the peeling vessel 1 now drops in a very short time to below atmospheric pressure. With this pressure in the peeling vessel 1, in combination with the temperature of the outer layer of the fruit or vegetable, an explosive formation of vapour occurs under the skin of the fruit or vegetable in the peeling vessel 1. This vapour formation proceeds so quickly that the vapour produced from the moisture present under the skin of the fruit or vegetable cannot diffuse through the skin. The pressure of the vapour under the skin is then such that the skin is blown, as it were, from the fruit or vegetable. If the pressure finally reached in the peeling vessel 1 is, for example, 0.1 bar, explosive vapour formation takes place under the skin even at a temperature of approximately 70° C.

Now that the fruit or vegetable has been peeled, the spraying system 30 is switched off and the valve 11 is closed. The lid 2 can now be opened to remove the peeled fruit or vegetable. The water vapour is condensed in the vessel 10 by starting up the spraying system 18. The condensed water obtained and the spraying water can then be removed via the drainage pipe 16.

Another possibility for achieving that, prior to the lowering of the pressure, besides the fruit or vegetable to be peeled and water vapour a reduced amount or virtually no air is present in the peeling vessel, is to let water vapour flow into the peeling vessel 1 via water vapour connection 7 and at the same time, via exhaust pipe 28 and valve 29, let the air flow out. Due to the difference in specific weight the water vapour will displace the air form the peeling vessel 1. The valve 29 in the exhaust pipe 28 for the air can be a temperature responsive valve, which closes when hot water vapour flows out via the valve.

Figure 2:
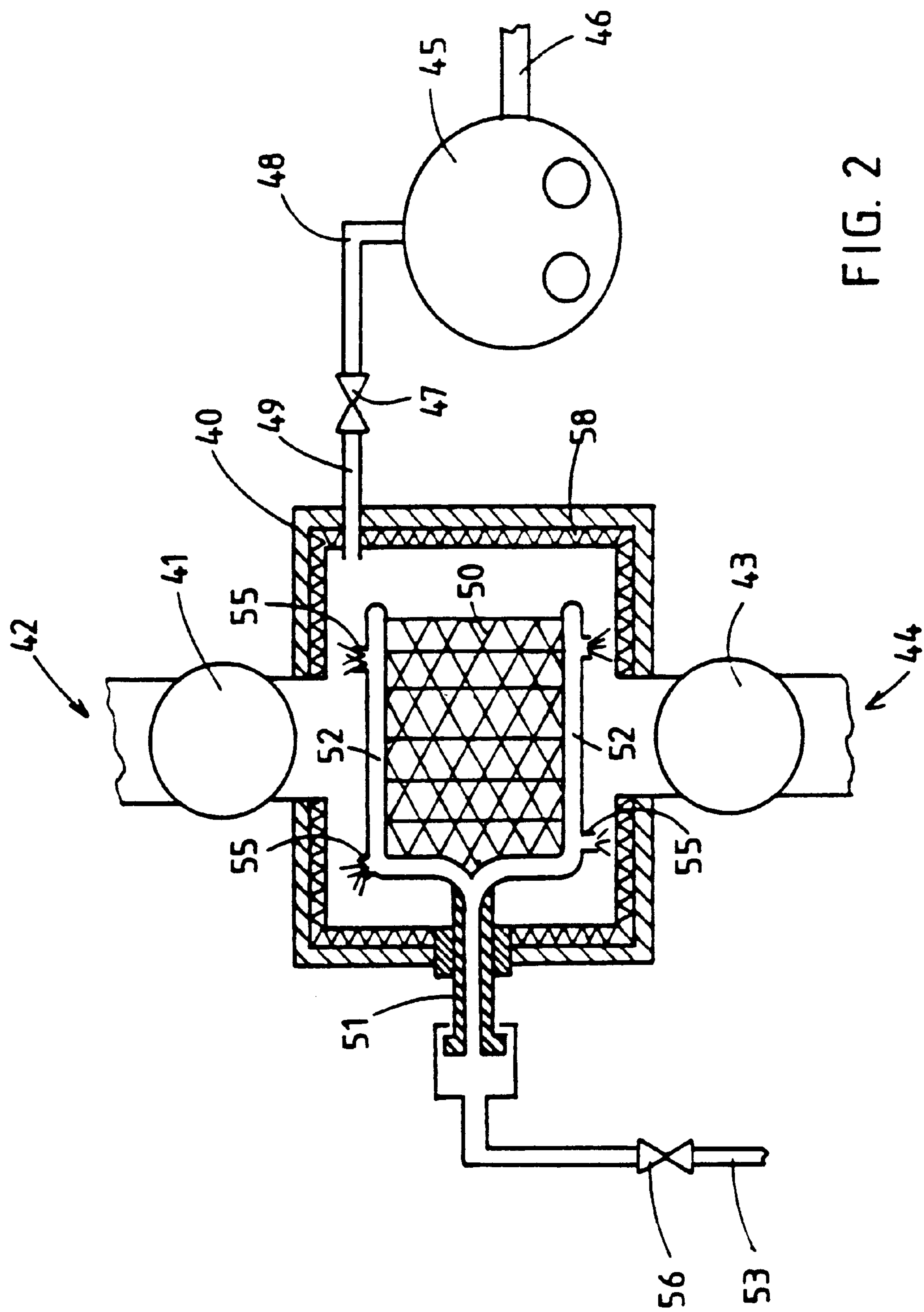
FIG. 2 shows a diagrammatic reproduction of a second exemplary embodiment of a device for peeling with the aid of vapour explosion in a manner according to the invention.

FIG. 2 shows diagrammatically and partially in section a preferred embodiment of the device according to the invention which can be used for peeling fruits or vegetables in the manner according to the invention.

The device comprises a peeling vessel 40 which is provided with an opening 42 at the top which can be closed off by a ball valve 41 in order to introduce the fruit or vegetable and with an opening 44 at the bottom which can be closed off by a ball valve 43 for removing the fruit or vegetable.

Water supplied via pipe 46 can be heated by heating unit 45 so that water vapour at a suitable temperature and pressure is obtained. The water vapour can be fed via a pipe 48 provided with a valve 47 to water vapour connection 49 of the peeling vessel 40.

In order to obtain a uniform heating of the entire batch of fruit or vegetable to be peeled, a cage 50 for the fruit or vegetable to be peeled, which cage is movably mounted in the peeling vessel 40 and allows vapour and liquid through, is disposed in the peeling vessel 40. The cage 50 is able to rotate as a result of the rotary drive of shaft 51 of the cage 50, for which purpose the device is provided with drive means, which are not shown. The cage 50 contains a plurality of tubes 52 which are in communication with a supply pipe 53 for cooling water. The tubes 52 are provided with a plurality of sprinklers 55 directed towards the wall of the peeling vessel 40 and cooling water can be sprayed into the peeling vessel 40 via sprinklers 55 by opening valve 56.

To peel a fruit or vegetable with the device shown in FIG. 2, the fruit or vegetable, for example potatoes, is introduced into the peeling vessel 40 via opening 42. This can be done, for example, by supplying the potatoes in a stream of liquid. It is also possible to incorporate the peeling vessel 40 in a liquid circuit with which the fruit or vegetable is supplied. The liquid (water) is replaced by water vapour at a suitably chosen temperature and pressure by opening the ball valve 43 for a short time after closing the ball valve 41 and simultaneously feeding water vapour to the peeling vessel 40. When the fruit or vegetable has been heated superficially to a sufficient extent, the supply of water vapour is stopped. As a result of then opening the valve 56, the sprinklers 55 spray cold water into the peeling vessel 40, as a result of which the water vapour cools quickly and condenses, and the pressure in the peeling vessel 40 drops to below atmospheric pressure. As a result of this lowering of pressure, the vapour explosion explained above takes place under the skin of the fruit or vegetable and the fruit or vegetable is peeled.

Since the intended rapid cooling of the water vapour in the peeling vessel 40 would be opposed by the still hot metal wall of the peeling vessel 40, a thermally insulating lining 58 is applied to the inside of the peeling vessel 40. Said lining 58 is preferably composed of a thermoplastic fluoropolymer or fluoroplastic.

In the peeling methods described with reference to figures, the course of the pressure lowering in the peeling vessel for the purpose of vapour explosion can expediently be controlled by regulating the supply of cold water which is sprayed into the peeling vessel. By regulating the rate at which cold water is introduced into the peeling vessel it is possible to determine at what rate water vapour is eliminated and how much and therefore at what rate and to what value the pressure in the peeling vessel drops to below atmospheric pressure.

It will be clear that, for the method described with reference to FIG. 2, it is a requirement that the air is preferably wholly or at least partially removed from the peeling vessel prior to the pressure lowering resulting in the vapour explosion because the intended pressure value below atmospheric pressure could otherwise never be achieved solely by eliminating the water vapour. If it were chosen not to remove the air prior to the pressure lowering resulting in the vapour explosion, but only during this pressure lowering, for example by making use of a vacuum pump connected to the peeling vessel, a vacuum pump with a very large capacity proves to be necessary. This can be appreciated on the basis of the following example.

50% of a peeling vessel having a capacity of 1 $m^3$ is filled with fruit or vegetable to be peeled, with the result that a volume of 0.5 $m^3$ is left over in the peeling vessel. If said volume of 0.5 $m^3$ were completely filled with air and if, to achieve a good peeling action with low loss of fruit or vegetable, it is desired to achieve a pressure lowering to 0.5 bar in 3 seconds in the peeling vessel, a vacuum pump having a capacity of 1200 $m^3$/h at 0.5 bar is necessary. If it were desired to reduce the pressure to 0.1 bar, a vacuum pump having a capacity of 6000 $m^3$ at 0.1 bar is even necessary. In this connection, it is assumed that the water vapour is completely eliminated by spraying cold water into the peeling vessel and that there are no pipe flow resistances between the peeling vessel and the vacuum pump. It will be clear that this is disadvantageous and requires high investments. If the water vapour were not to be eliminated by condensation but were to be removed from the peeling vessel together with the air, the removal capacity would have to be, as in the case of the method disclosed in FR 2 144 135, approximately 100,000 $m^3$/h if it is desired to reduce the pressure to 0.1 bar in 3 seconds. This requires a drainage pipe having a bore of approximately 10 $m^2$, which is not realistic in practice.

Preferably, therefore, as much air as possible is removed from the peeling vessel prior to the pressure lowering resulting in the vapour explosion. The removal of the air to a small extent prior to the pressure lowering in the peeling vessel resulting in the vapour explosion is not particularly advantageous. Thus if 40% or 75% of the air were to be removed from the abovementioned peeling vessel prior to the pressure lowering resulting in the vapour explosion, the pressure could not be reduced to 0.1 bar by eliminating the water vapour in the peeling vessel solely by condensation; an additional vacuum pump having a large capacity of, respectively, at least 3600 $m^3$/h or 1500 $m^3$/h would then still be necessary. According to the invention, preferably virtually all the air, for example 95%, is removed from the peeling vessel prior to the pressure lowering resulting in the vapour explosion, with the result that it will be sufficient to spray 15 litres of cold water in 3 seconds into the peeling vessel in order to obtain the intended pressure lowering in the peeling vessel.

In the present description and the claims, the term air is always used because it is assumed that the peeling of the fruit or vegetable takes place in an environment containing air. However, it is conceivable that the vapour explosion peeling method described here takes place in an environment containing a different gas which does not condense under the conditions encountered in the method according to the invention. The term air is therefore also to be understood as meaning any other gas which does not condense under the conditions encountered in the method according to the invention.

I claim:

1. A method for removing skins from fruits or vegetables by vapour explosion, comprising the steps of:

introducing a fruit or vegetable to be peeled into a peeling vessel;

feeding water vapour to the peeling vessel to heat the fruit or vegetable to be peeled superficially; and rapidly lowering the pressure in the peeling vessel to a predetermined pressure below atmospheric pressure in order to explosively vaporize moisture present under the skin of the superficially heated fruit or vegetable, so as to blow the skin from the fruit or vegetable;

wherein, prior to the rapidly lowering step, air is removed from the peeling vessel such that the rapidly lowering step can be carried out solely by condensing water vapour in the vessel.

2. The method of claim 1 wherein at least 90% of the air is removed from the peeling vessel.

3. The method of claim 1 wherein the rapidly lowering step is carried out by introducing a coolant into the peeling vessel thereby condensing water vapor present in the peeling vessel.

4. A method for removing skins from fruits or vegetables by vapour explosion, comprising the steps of:

introducing a fruit or vegetable to be peeled into a peeling vessel;

removing air from the peeling vessel by simultaneously feeding water vapour to the peeling vessel and allowing air to flow out of the peeling vessel, the water vapor also heating the fruit or vegetable superficially;

condensing water vapour in the peeling vessel and thereby rapidly lowering the pressure in the peeling vessel to a predetermined pressure below atmospheric pressure in order to explosively vaporize moisture present under the skin of the superficially heated fruit or vegetable, so as to blow the skin from the fruit or vegetable.

5. A method of removing skins from fruits or vegetables by vapour explosion, comprising the steps of:

filling the peeling vessel with a liquid;

closing the peeling vessel in a gastight manner;

opening a liquid withdrawal valve of the peeling vessel and withdrawing liquid from the vessel, thereby creating a vacuum in the peeling vessel;

feeding water vapour to said peeling vessel to heat the fruit or vegetable superficially;

rapidly lowering the pressure in the peeling vessel to a predetermined pressure below atmospheric pressure in order to explosively vaporize moisture present under the skin of the superficially heated fruit or vegetable, so as to blow the skin from the fruit or vegetable.

* * * * *